July 14, 1970     H. SMALES     3,520,389

CLUTCH PLATES

Filed Feb. 2, 1968     3 Sheets-Sheet 1

INVENTOR

Herbert Smales

By Pierce, Scheffler & Parker
Attorneys

July 14, 1970 H. SMALES 3,520,389
CLUTCH PLATES

Filed Feb. 2, 1968 3 Sheets-Sheet 3

INVENTOR
Herbert Smales
By Pierce, Scheffler & Parker
Attorneys

INVENTOR
Herbert Smales

United States Patent Office 3,520,389
Patented July 14, 1970

3,520,389
CLUTCH PLATES
Herbert Smales, New Brighton, Morley, England, assignor to BBA Group Limited, Cleckheaton, Yorkshire, County, England, a British company
Filed Feb. 2, 1968, Ser. No. 702,605
Claims priority, application Great Britain, Feb. 3, 1967, 5,321/67
Int. Cl. F16d *13/60*
U.S. Cl. 192—107
3 Claims

ABSTRACT OF THE DISCLOSURE

A friction clutch mechanism for connecting a driving shaft to a driven shaft includes a clutch plate carried between a driving plate and a pressure plate and means for engaging the driving and pressure plates with the clutch plate. The clutch plate is divided along substantially radial lines to establish a plurality of resilient tongue or sector-like sections and which are axially displaced from a central plane of the plate so as to normally lie alternately on opposite sides of such plane. Pads of friction material are attached to both sides of the plate sections and have, on each side of the clutch plate, for contact with the opposed driving and pressure plates respectively, mating surfaces having an aggregate area less than 30% of the swept area of the clutch.

---

This invention relates to clutch mechanisms and in particular to a friction clutch mechanism which includes cooperating driving and driven members having opposed surfaces which are brought into and out of frictional engagement.

Friction clutch mechanisms are well known in engineering and an example of a simple clutch mechanism is the "single disc clutch" which has a metal driving plate (which can be rotatively driven by an internal combustion engine or other prime mover), a clutch plate which is normally a metallic disc having two organic friction linings of annular disc shape riveted one on each of its circular side faces and a metal pressure plate adapted to press the clutch plate to mate with the driving plate. The pressure plate is usually driven by the prime mover and the clutch plate is connected to, and drives, the output side of the clutch mechanism.

The organic friction linings are usually manufactured as an integral member from resin bonded asbestos material, which if desired, can be provided with various fillers.

During operation of the above described clutch mechanism the surface area of the friction linings which mate, and are in rubbing contact, with the driving plate and the pressure plate is almost as great as the swept area of the metal mating faces of the driving and pressure plates, the surface area of the friction linings relative to the surface area of the plates being reduced only by the area of the rivet holes which are formed during the attachment of the friction linings to the clutch plate.

It has hitherto been proposed slightly to reduce the surface area of the friction linings which are in rubbing contact with their mating plates by pressing or machining grooves in the mating surface of the friction linings in a more or less radial direction. Such radially formed grooves permit dust, which is the product of wear during operation of the clutch mechanism, to escape from the mating surfaces.

It has further been proposed to apply the friction linings to the circular face of a clutch plate in the form of segments instead of complete discs, each segment being separately attached, for example by rivets, to the clutch plate so that a symmetrical disposition of the friction lining is provided on the face of the clutch plate. This enables the friction linings to have a total mating surface area which allows them to cover the greater part of the metal mating face on the driving plate or the pressure plate.

In clutch mechanisms which incorporate a clutch plate having friction linings disposed thereon in the manner above described it has been determined that the main cause of a falling-off in performance and of rapid wear in the clutch mechanism is due to overheating of the mating surfaces of the clutch linings and it is an object of the present invention to provide a friction clutch mechanism having friction material which material is so disposed in the mechanism to provide increased efficiency to the friction material during use of the clutch mechanism.

According to the present invention there is provided a friction clutch mechanism for connecting a driving shaft and a driven shaft which includes a clutch plate carried between a driving plate and a pressure plate of the mechanism and means for engaging the driving and pressure plates with the clutch plate. The clutch plate is divided by cutting along substantially radial lines to establish a plurality of resilient tongues or sector-like sections extending from an uncut hub portion of the plate to the periphery thereof that are axially displaced from a central plane of the plate so as to normally lie alternately on opposite sides of such plane and provide resilient mountings for friction material carried by the plate. The friction material is made up in pad form and the pads are attached to both sides of the resilient plate sections and are thereby resiliently mounted and normally extend in planes substantially parallel to the central plane of the plate. The friction pads have, on each side of the clutch plate, for contact with the opposed driving and pressure plates respectively, mating surfaces having an aggregate area of less than 30% of the swept area of the clutch.

By "swept area of the clutch" as used throughout this specification and appended claims there is meant the area over which direct contact between the driving and driven members of the clutch takes place while these members are moving relative to each other. Preferably, the aggregate area of the friction material on the or each surface which is adapted for frictional engagement with an opposed surface or surfaces is not greater than 20% and is not less than 10% of the swept area of the clutch.

The pads are preferably symmetrically disposed over the surface of the member which carries them so that, during rotation, the member is maintained in balance.

A considerable advantage in the use of a friction clutch mechanism constructed in accordance with the present invention is that a thermal balance is attained. The total heat generated during operation of a clutch mechanism depends, to a large extent, on the work which is done by the clutch mechanism and the amount of slip between the mating surface or surfaces of the friction material and the opposed mating surface or surfaces of the member or members with which it is in contact. By the clutch mechanism of the present invention, a lower surface temperature is attained between the mating surfaces than that which would be expected in hitherto proposed constructions. The reduction in surface temperature is achieved partly because the heat developed during operation of the clutch mechanism can escape from the relatively large uncovered metal surface of the member or members with which the friction lining mates and partly because time of contact between each element of the mating surface with the areas of friction material is reduced relative to hitherto proposed constructions. As a result clutch mechanisms made in accordance with the present invention exhibt a relatively higher consistency of friction under high duty service than clutch mechanisms of hitherto proposed constructions.

The friction material may be fixed to both faces of the clutch plate by any desired means, for example riveting, cementing, moulding in situ, slotting ribs formed in the material into complementary grooves or slots provided in the plate or by any combination of these means.

The clutch mechanism is designed so that a cushioning effect is provided during engagement between the opposed surfaces. Such cushioning effect is provided by resiliently mounting the friction material. The or each clutch plate is provided with tongues or sectors which are axially deformed from the plane on rotation of the plate to be slightly out of alignment with the plane of rotation and each tongue or sector provides a resilient mounting for a pad of the friction material.

In view of the relatively reduced total mating surface area of the friction material, the member or members which carry the friction material can be reduced in area at its or their outer periphery. Such reduction in area is of value since it permits a reduction in weight and consequently in inertia during rotation of the member or members.

Two preferred embodiments of the present invention will now be described, by way of example only, with reference to the accompanying illustrative drawings in which:

FIG. 1 diagrammatically illustrates a simple clutch mechanism constructed in accordance with the present invention and which incorporates a single clutch plate, the clutch plate carrying friction material on each surface thereof;

Where possible throughout the following description, like parts or members referred to in each of the figures have been accorded like references.

Figure 1:
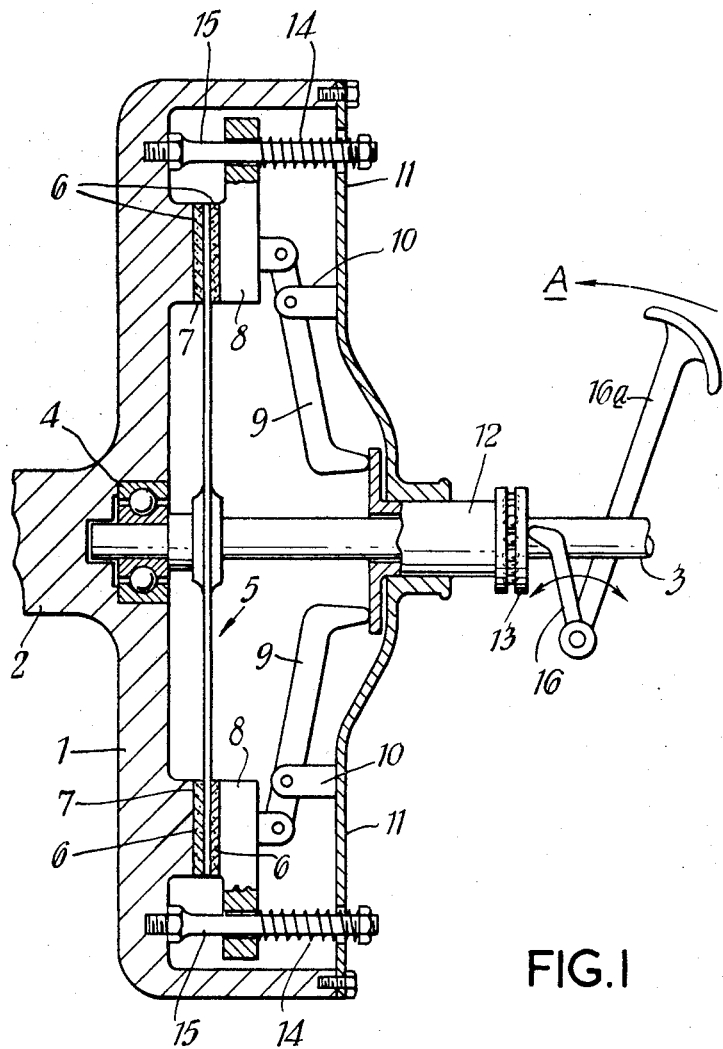

Referring firstly to FIG. 1, the basic construction of the clutch mechanism illustrated is well known in the art and includes a driven member which is conveniently in the form of a flywheel 1 which is adapted to be rotatably driven through an input shaft 2 by, for example, an internal combustion engine.

Coaxial with the shaft 2 is an output shaft 3 which is mounted in a bearing 4 to be capable of axial rotation relative to the input shaft. Secured to the output shaft 3 and extending in a radial plane therefrom is a clutch plate shown generally at 5 which carries friction material 6 on both surfaces thereof. The friction material 6 is fixedly secured to the clutch plate for example by rivets, cementing or other means well known in the art. The clutch plate 5 is conveniently splined or keyed to the output shaft 3 to give a sliding fit.

The friction material 6 is located adjacent to an annular flat 7 provided on the flywheel 1 and is situated between the flat 7 and an annular pressure plate 8. The pressure plate 8 is pivotally carried on arms 9 which arms are pivotally mounted on brackets 10. The brackets 10 are fixedly secured to a cover plate 11 which is bolted for rotation with the flywheel 1. The arms 9, at a position on the side of the brackets 10 remote from the pivotal connections to the pressure plate 1, are adapted to abut a flanged sleeve 12 which is carried on a thrust bearing 13 provided on the output shaft 3. The sleeve 12 is axially slidable relative to the cover plate 11 to abut the arms 9 and to cause the arms 9 to pivot on the brackets 10 and thereby the pressure plate 8 to move relatively away from the flat 7.

The pressure plate 8 is spring-loaded to be biased in a direction towards the flat 7 by coil springs 14 carried on rods 15 which rods are fixed to, and rotate with, the flywheel 1.

Adapted to engage with the sleeve 12 to impart axial movement thereto is a fork member 16 which is mounted to exhibit pivotal movement through a lever 16a.

With the clutch mechanism in the position shown in FIG. 1, the frictional material 6 is in frictional engagement with both the flat 7 and pressure plate 8 and is gripped therebetween by the force exerted by the springs 14. It will be apparent that when the shaft 2 rotates, the flywheel 1 and pressure plate 8 rotate and since the frictional material 6 is in engagement therewith, the clutch plate 5 rotates and with it the output shaft 3.

If the lever 16a is moved in the direction of arrow A the fork 16 abuts the sleeve 12 and causes it to move axially towards the clutch plate 5. The arms 9 are pivoted on the brackets 10 and the pressure plate 8 moves away from the flat 7 against the action of the springs 14. The pressure on the frictional material 6 and thereby on the clutch plate 5 is released thereby disengaging the clutch and little or no power is transmitted from the rotating input shaft 2 to the output shaft 3.

In the embodiment illustrated it will be apparent that the swept area of the rotating faces between the flat 7 and, in effect, the clutch plate 5, and also between the pressure plate 8 and in effect, the clutch plate 5 is, in each case, the area of the annular flat 7. It has been determined that efficient operation is achieved when the area of the friction material 6 which frictionally engages on one side of the plate 5 with the flat 7 and on the other side of the plate 5 with the pressure plate 8 is, for each side of the plate, less than 30% of the swept area and is preferably between 10% and 20% of the swept area. Preferably, the areas of the friction material which engage with the flat 7 and pressure plate 8 are symmetrically disposed on the clutch plate 5 so that the clutch plate is not out of balance.

Figure 2:
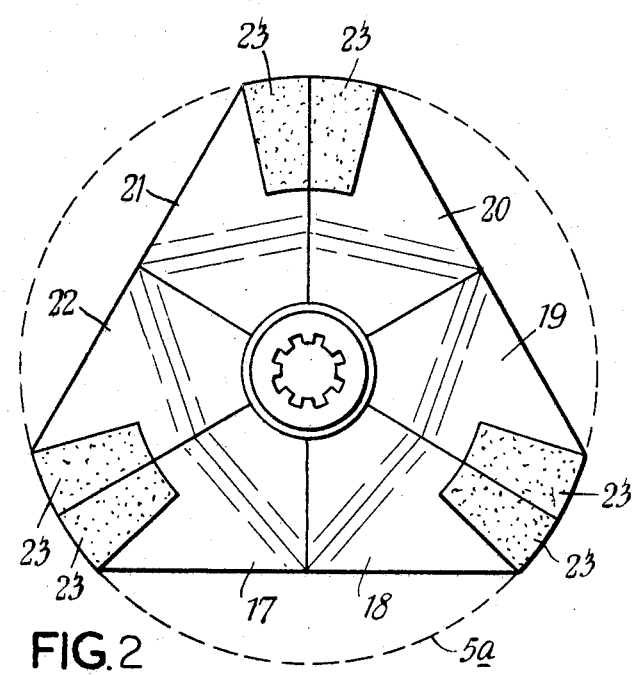
FIG. 2 illustrates a side view of a clutch plate suitable for use in the clutch mechanism shown in FIG. 1 which plate provides a cushioning effect during engagement of the clutch.
Figure 3:
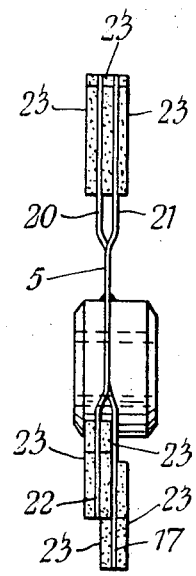
FIG. 3 is an end view of the plate shown in FIG. 2.

Referring now to FIGS. 2 and 3, the friction plate 5 is of triangular form. The design of the plate in FIG. 2 can best be considered by reference to a disc plate shown by the broken line 5a. Each surface of the disc carries three adjacent pairs of discrete pads 23 of friction material which are rigidly secured thereto and are located adjacent the circumferential edge of the disc in a symmetrical and spaced array. Each pad 23 is of uniform thickness and of sectorial annular shape. By "sectorial annular" is meant the portion of an annulus the ends of which portion are parts of the radii of the circle which defines the largest circumferential part of the annulus. Each pad 23 is located symmetrically on a radius of the disc 5a and the radii on which adjacent pairs of pads are located are at approximately 120°. The length of the pads 23 in the radial sense of the disc 5a is equal to the length of the flat 7 in the radial sense of the output shaft 3 and the area of each adjacent pair of pads is approximately 5% of the area of the flat 7. Consequently the total area of the friction material on each surface of the plate 5 is approximately 15% of the area of flat 7, i.e., of the swept area. The triangular form of the clutch plate 5 is obtained from the disc 5a by removing the segments of the disc defined by the chords between adjacent pads.

Although the pads are preferably of sectorial annular form it will be apparent that they can take a form other than that of sectorial annular, for example, of circular, segmental, or rectangular form.

The triangular clutch plate 5 is cut along radii of the disc 5a from which the clutch plate 5 is taken into six symmetrically disposed sections in the form of sectors 17 to 22 extending from an uncut hub portion of the plate to its periphery. Each sector 17 to 22 carries two discrete pads 23 of friction material, one on each surface thereof, and the area of each pad 23 is approximately 2½% of the swept area. The sectors 17 to 22 are deformed, for example, by bending or moulding, to displace the pads 23 axially out of the plane of intended rotation of the plate 5 so that they lie alternately on opposite sides of the plane of rotation of the plate. As will be apparent from FIG. 3 the sectors 18, 20 and 22 are deformed to displace their pads 23 in one sense axially from the plane of rotation of the plate 5 and the sectors 17, 19 and 21 are deformed to displace their pads 23 in the opposite sense axially from the plane of rotation of the plate 5. The plate 5 is of metal and the deformation of the sectors in effect provides a resilient mounting for the pads 23. The resilient mounting of the pads provides a cushioning effect during engagement of the clutch since the pads 23 tend to be displaced by the flat 7 and pressure plate 8 into the plane of rotation of the plate 5 and when the clutch is disengaged the pads automatically return to the position shown in FIG. 3.

If required, the sectors 17 to 22 and their associated pads 23 can be made separately and it will be apparent that the shape and construction of each sector is identical. Consequently, the clutch plate can be assembled from the independent sectors and the sector can be interchanged or replaced as necessary.

Figure 4:
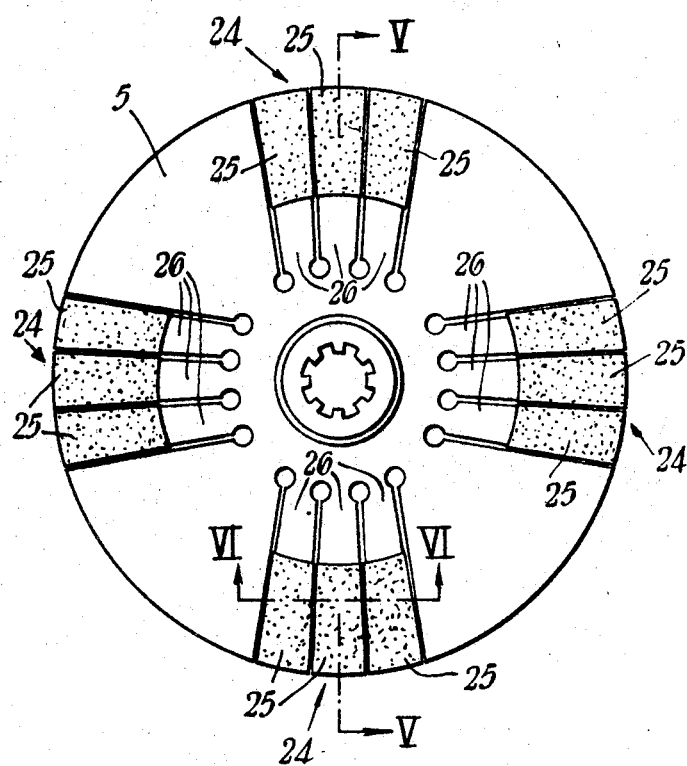
FIG. 4 illustrates a side view of a modified clutch plate suitable for use in the clutch mechanism shown in FIG. 1 which plate provides a cushioning effect during engagement of the clutch.
Figure 5:
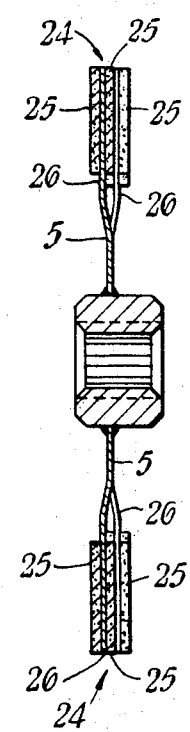
FIG. 5 is a cross section of the plate shown in FIG. 4 taken on the line V—V of FIG. 6.
Figure 6:
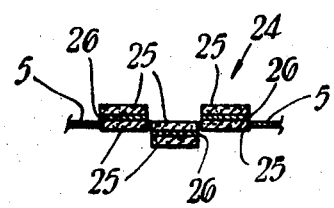
FIG. 6 is a scrap cross section of the plate shown in FIG. 4 taken on the line VI—VI of FIG. 6.

In the modification shown in FIGS. 4 to 6, the clutch plate 5 is of disc form and carries, on each surface thereof, four symmetrically disposed groups 24 of pads of friction material. Each group 24 comprises an array of three adjacently and circumferentially located discrete pads 25. The disc 5 is cut in substantially radial directions to provide four groups of symmetrically disposed and substantially radially extending tongue-like sections 26 on each surface of which a pad 25 is located. There are three tongue sections located side by side in each group. The area of each pad 25 is approximately 1½% of the swept area so that the total area of friction material on each side of the clutch plate 5 is approximately 18% of the swept area. The tongue sections 26 are deformed as shown in FIGS. 5 and 6 to displace the pads 25 out of the plane of intended rotation of the disc so that the pads 25 in each group 24 for both surfaces of the disc lie alternately on opposite sides of the central plane of rotation of the disc. The disc is of metal and the deformation of the tongues in effect provides a resilient mounting for the pads 25. The resilient mounting of the pads provides a cushioning effect during engagement of the clutch in a similar manner to that above described with reference to FIGS. 2 and 3.

It will be appreciated that although the clutch plates above described with reference to FIGS. 2 to 6 are considered in their application to a clutch mechanism of the single clutch plate type, they are also applicable to clutch mechanisms which incorporate multiclutch plates, for example which have two or more clutch plates in tandem, and any modifications which are necessary in the construction of the plates for such further applications will be apparent to persons skilled in the art.

The frictional material preferably has an asbestos fiber base and can be made to the following formulation in which the percentages given are by weight:

|  | Percent |
|---|---|
| Asbestos fiber | 40 |
| Powdered phenolic resin (200 mesh) | 15 |
| Carbon black | 2 |
| Barytes | 12.5 |
| Brass particles | 12.5 |
| Cashew shell resin friction dust | 6 |
| Graphite | 5 |
| Copper powder | 7 |

The above material is moulded to the required shaped pads and cured at a pressure of one ton per square inch and 320° F. under normal conditions for moulding phenolic resin bonded materials.

Pads made in accordance with the above formulation were mounted on a clutch plate in a manner similar to that shown in FIGS. 2 and 3 and were tested in a clutch test machine under conditions in accordance with the present invention. The pads showed an average coefficient friction of 0.4 and gave satisfactory service for approximately 5000 engagements. A test of the friction material in accordance with the above formulation when applied to a clutch plate in a manner which has hitherto been proposed, for example using full face annular disc pads, gave a lower and rather more variable friction averaging 0.36 thereby showing the considerable improvement which is possible in the friction coefficient of the clutch mechanism by suitable limitation and disposition of the friction material.

It will be appreciated that the shape or configuration of the clutch plates as above described and illustrated and the disposition thereon of the friction material is by way of example only and the clutch plates can be varied in design or formulation within the scope of the appended claims.

What we claim is:

1. In a friction clutch mechanism for connecting a driving shaft and a driven shaft;
   a clutch plate carried between a driving plate and a pressure plate of said clutch mechanism;
   means for engaging said driving and pressure plates with opposite sides of said clutch plate;
   said clutch plate being divided along substantially radial lines to establish a plurality of resilient plate sections extending from a hub portion of the plate to the periphery thereof, each of said plate sections being axially displaced as a whole from a central plane of said plate so as to normally lie in a plane substantially parallel with said central plane, said plate sections being axially displaced from said central plane alternately on opposite sides of said central plane and provide resilient mountings for friction material carried by said clutch plate and
   discrete pads of friction material attached to opposite sides of said plate sections and which normally extend in planes substantially parallel to said central plane of said clutch plate, said pads having, on each side of said clutch plate for contact with the opposed driving and pressure plates respectively, mating surfaces the aggregate area of which lies between 10 and 30% of the swept area of said clutch mechanism.

2. A friction clutch mechanism as defined in claim 1 wherein the aggregate area of the mating surfaces of said friction pads on each side of said clutch plate is at least 10% and is less than 20% of the swept area of the clutch mechanism.

3. A friction clutch mechanism as defined in claim 1 wherein said clutch plate has a circular configuration and is divided into a plurality of uniformly circumferentially spaced groups of plate sections, the plate sections of each said group being disposed in side-by-side relation and including said friction pads on the opposite sides thereof.

(References on following page)

References Cited

UNITED STATES PATENTS

| | | | | |
|---|---|---|---|---|
| 1,700,493 | 1/1929 | Guay | 192—107 | XR |
| 1,904,953 | 4/1933 | Saks | 192—107 | XR |
| 1,992,626 | 2/1935 | Nutt | 192—107 | XR |
| 2,146,043 | 2/1939 | Wolfram | 192—107 | XR |
| 2,299,028 | 10/1942 | Nutt et al. | 192—107 | XR |
| 2,337,111 | 12/1943 | Joyce | 192—107 | XR |
| 2,337,134 | 12/1943 | Thelander | 192—107 | XR |
| 2,392,246 | 1/1946 | Katcher | 192—107 | XR |
| 2,520,350 | 8/1950 | Wemp | 192—107 | XR |
| 2,888,122 | 5/1959 | Garmanger | 192—107 | XR |
| 2,916,123 | 12/1959 | Garmanger | 192—107 | XR |
| 3,164,236 | 1/1965 | Baynes et al. | 192—107 | XR |
| 3,280,949 | 10/1966 | Ross | 192—107 | XR |

MARTIN P. SCHWADRON, Primary Examiner

L. J. PAYNE, Assistant Examiner

U.S. Cl. X.R.

192—113.1